United States Patent
Yamamoto

(10) Patent No.: US 12,049,054 B2
(45) Date of Patent: Jul. 30, 2024

(54) TIRE MANUFACTURING DEVICE AND TIRE MANUFACTURING METHOD

(71) Applicant: Toyo Tire Corporation, Itami (JP)

(72) Inventor: Taizo Yamamoto, Itami (JP)

(73) Assignee: Toyo Tire Corporation, Itami (JP)

( * ) Notice: Subject to any disclaimer, the term of this patent is extended or adjusted under 35 U.S.C. 154(b) by 66 days.

(21) Appl. No.: 17/544,281

(22) Filed: Dec. 7, 2021

(65) Prior Publication Data

US 2022/0219418 A1      Jul. 14, 2022

(30) Foreign Application Priority Data

Jan. 8, 2021    (JP) ................... 2021-002415

(51) Int. Cl.
*B29D 30/24*     (2006.01)
*B29D 30/20*     (2006.01)

(52) U.S. Cl.
CPC ...... *B29D 30/246* (2013.01); *B29D 2030/202* (2013.01)

(58) Field of Classification Search
CPC .... B29D 30/005; B29D 30/20; B29D 30/244; B29D 30/26; B29D 30/2607; B29D 30/246; B29D 30/28; B29D 30/3021; B29D 30/3028; B29D 2030/0038; B29D 2030/0055; B29D 2030/0682; B29D 2030/202; B29D 2030/204; B29D 2030/206; B29D 30/0016; B29D 30/14; B29D 30/16; B29D 30/1621; B29D 30/1628; B29D 2030/0022; B29D 2030/3257; B29D 2030/3264; B29D 2030/582

USPC ........... 156/130.3, 394.1, 396, 421
See application file for complete search history.

(56) References Cited

U.S. PATENT DOCUMENTS

| | | | | | |
|---|---|---|---|---|---|
| 3,475,254 | A | * | 10/1969 | Henley | B29D 30/58 156/416 |
| 3,700,526 | A | * | 10/1972 | Brey | B29D 30/44 156/396 |
| 3,867,228 | A | * | 2/1975 | Brinkley | B29D 30/3007 156/396 |
| 4,204,903 | A | * | 5/1980 | Alexander | B29D 30/2607 414/223.01 |

(Continued)

FOREIGN PATENT DOCUMENTS

| | | | |
|---|---|---|---|
| WO | 2006/048924 A1 | 5/2006 | |
| WO | WO-2016056169 A1 * | 4/2016 | ............. B29D 30/26 |

OTHER PUBLICATIONS

Hayashi K, WO-2016056169-A1, machine translation. (Year: 2016).*

*Primary Examiner* — Sedef E Paquette
(74) *Attorney, Agent, or Firm* — WHDA, LLP

(57) ABSTRACT

A tire manufacturing device includes: a molding drum; a first moving portion in which the molding drum moves in order to mold an inner liner layer on the molding drum; a second moving portion in which the molding drum moves in order to mold a ply layer on the inner liner layer; a stitcher position where a carcass band is formed by performing pressing from above the ply layer laminated on the inner liner layer; and a transfer position where the carcass band is transferred from the molding drum to a transport device that transports the carcass band to a subsequent process, and the stitcher position and the transfer position are adjacent to each other.

4 Claims, 14 Drawing Sheets

(56) References Cited

U.S. PATENT DOCUMENTS

| | | | | |
|---|---|---|---|---|
| 4,314,864 | A * | 2/1982 | Loeffler | B29D 30/0016 |
| | | | | 156/126 |
| 4,473,427 | A * | 9/1984 | Irie | B29D 30/08 |
| | | | | 211/23 |
| 6,773,530 | B2 * | 8/2004 | Zeh | B29D 30/005 |
| | | | | 156/111 |
| 2002/0074077 | A1 * | 6/2002 | Ikeda | B29C 48/07 |
| | | | | 156/130.7 |
| 2009/0133808 | A1 | 5/2009 | Tatara et al. | |
| 2010/0043949 | A1 * | 2/2010 | Fujiki | B29D 30/28 |
| | | | | 156/123 |
| 2012/0055634 | A1 * | 3/2012 | Fujiki | B29D 30/28 |
| | | | | 156/414 |

\* cited by examiner

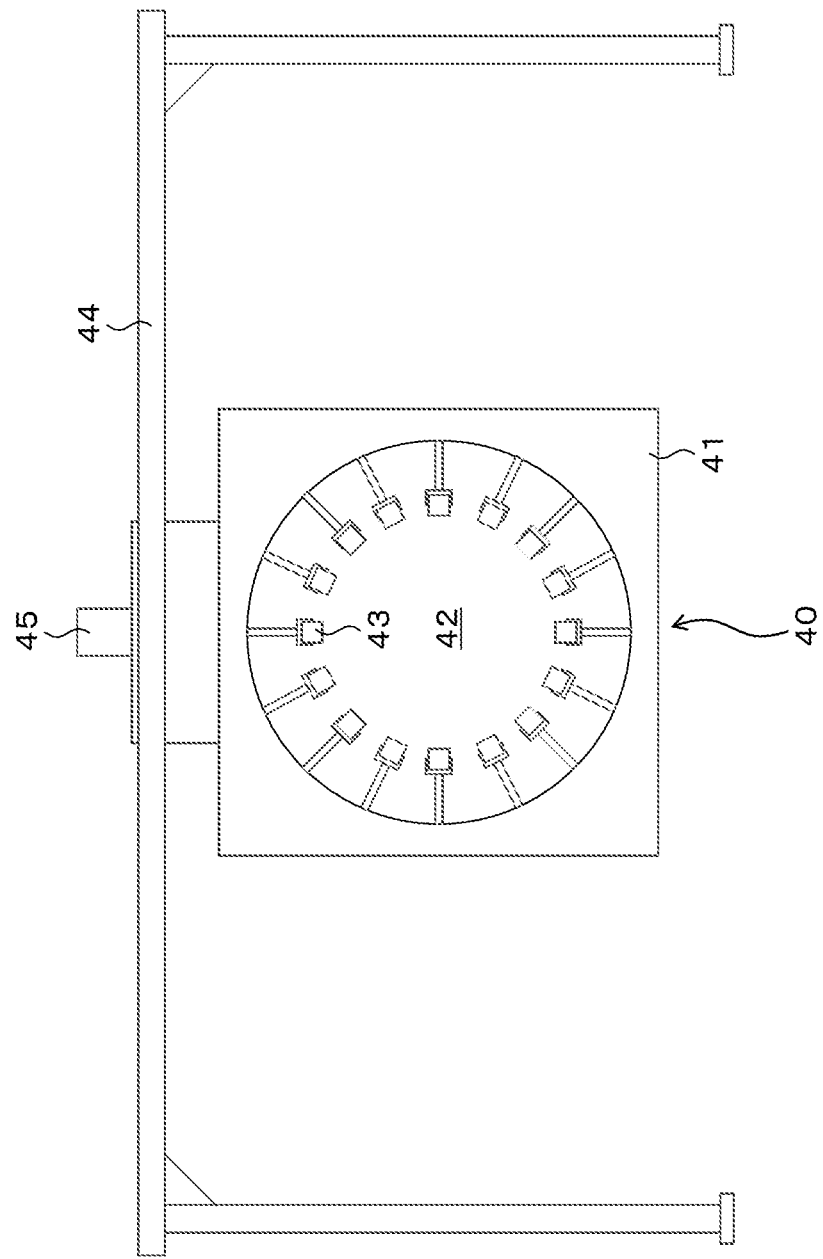

Fig. 4

| FIRST MOLDING DRUM | | SECOND MOLDING DRUM | |
| --- | --- | --- | --- |
| OPERATION PERFORMED | LOCATION OF DRUM | OPERATION PERFORMED | LOCATION OF DRUM |
| MOLDING OF INNER LINER | | MOLDING OF SQUEEGEE | |
| MOLDING OF CHAFER | FIRST MOVING PORTION | MOLDING OF FIRST CARCASS PLY | SECOND MOVING PORTION |
| MOLDING OF SIDE WALL | | MOLDING OF SECOND CARCASS PLY | |
| MOVE TO SECOND MOVING PORTION | TURNTABLE | STITCHER | |
| MOLDING OF SQUEEGEE | | TRANSFER OF CARCASS BAND | TRANSFER POSITION |
| MOLDING OF FIRST CARCASS PLY | SECOND MOVING PORTION | MOVE TO FIRST MOVING PORTION | TURNTABLE |
| MOLDING OF SECOND CARCASS PLY | | MOLDING OF INNER LINER | |
| STITCHER | | MOLDING OF CHAFER | FIRST MOVING PORTION |
| TRANSFER OF CARCASS BAND | TRANSFER POSITION | MOLDING OF SIDE WALL | |
| MOVE TO FIRST MOVING PORTION | TURNTABLE | MOVE TO SECOND MOVING PORTION | TURNTABLE |

TIRE MANUFACTURING DEVICE AND TIRE MANUFACTURING METHOD

CROSS-REFERENCE TO RELATED APPLICATIONS

This application is based upon and claims the benefit of priority from Japanese Patent Application No. 2021-002415 (filing date: Jan. 8, 2021). This application includes all of contents of Japanese Patent Application 2021-002415 by reference to Japanese Patent Application 2021-002415.

BACKGROUND OF THE INVENTION

1. Field of the Invention

The present invention relates to a tire manufacturing device and a tire manufacturing method.

2. Description of the Related Art

As described in WO 2006/048924 (Patent Literature 1), in manufacture of a pneumatic tire, a carcass band and a belt band are separately molded, and then they are combined and molded as a tire. The carcass band includes an inner liner layer made of an inner liner, a chafer, a side wall, and the like, and a ply layer made of a squeegee, one or more carcass plies, and the like.

As described in Patent Literature 1, in the manufacture of the carcass band, first, the side wall, the chafer, and the inner liner are laminated on a molding drum to mold the inner liner layer, and the squeegee and the carcass ply are laminated on the inner liner layer to mold the ply layer. After that, the carcass band is completed through a process called a stitcher of pressing the ply layer from above by a roller.

The carcass band is sent to a next process, and integrated with the belt band or the like consisting of a belt and a tread to become a raw tire before vulcanization molding.

Incidentally, in a carcass band manufacturing device in the related art, as described in Patent Literature 1, a first moving portion in which a molding drum moves in order to mold an inner liner layer and a second moving portion in which the molding drum moves in order to mold a ply layer are provided adjacent to each other. A stitcher device is provided at an end portion of the second moving portion on a side opposite to the first moving portion. In addition, an end portion of the first moving portion on a side opposite to the second moving portion is in a transfer position where the carcass band is transferred to a transport device in order to send the carcass band to the next process.

Then, one molding drum moves in an order of the first moving portion, the second moving portion, a location of the stitcher device, and the transfer position, and the carcass band is molded and carried out to a subsequent process.

However, it takes time to mold an inner liner layer in a first moving portion. In particular, when a long rubber strip extruded from an extruding machine is helically wound around a molding drum to mold a tire constituting member, it may take time to mold the inner liner layer. In particular, when a large volume inner liner layer made of a side wall is molded from a rubber strip, or when a particularly thin inner liner layer is molded from a rubber strip, it tends to take time to mold the inner liner layer.

Therefore, even if the molding of a carcass band by a stitcher device is completed early during the molding of the inner liner layer, the carcass band is not transferred to a transfer position until the molding of the inner liner layer is completed, which is inefficient.

SUMMARY OF THE INVENTION

Therefore, an object of the invention is to provide an efficient tire manufacturing device and tire manufacturing method.

A tire manufacturing device of an embodiment includes: a molding drum; a first moving portion in which the molding drum moves in order to mold an inner liner layer on the molding drum; a second moving portion in which the molding drum moves in order to mold a ply layer on the inner liner layer; a stitcher position where a carcass band is formed by performing pressing from above the ply layer laminated on the inner liner layer; and a transfer position where the carcass band is transferred from the molding drum to a transport device that transports the carcass band to a subsequent process, and the stitcher position and the transfer position are adjacent to each other.

In addition, a tire manufacturing method of the embodiment includes: a step of molding an inner liner layer on a molding drum while moving the molding drum in a first moving portion; a step of molding a ply layer on the inner liner layer on the molding drum while moving the molding drum in a second moving portion; a step of forming a carcass band by performing pressing from above the ply layer laminated on the inner liner layer in a stitcher position; and a step of transferring the carcass band to a transport device that transports the carcass band to a subsequent process at a transfer position, and the carcass band is transferred from the stitcher position to the adjacent transfer position.

According to the tire manufacturing device and the tire manufacturing method of the embodiment, a pneumatic tire can be efficiently manufactured.

BRIEF DESCRIPTION OF THE DRAWINGS

FIG. 3 is a left side view of a stitcher device.
FIG. 4 is a time chart of a tire manufacturing method.

DESCRIPTION OF THE PREFERRED EMBODIMENTS

An embodiment will be described with reference to drawings. The embodiment described below is merely an example, and appropriate modifications without departing from the spirit of the invention are included in a scope of the invention.

Figure 14:
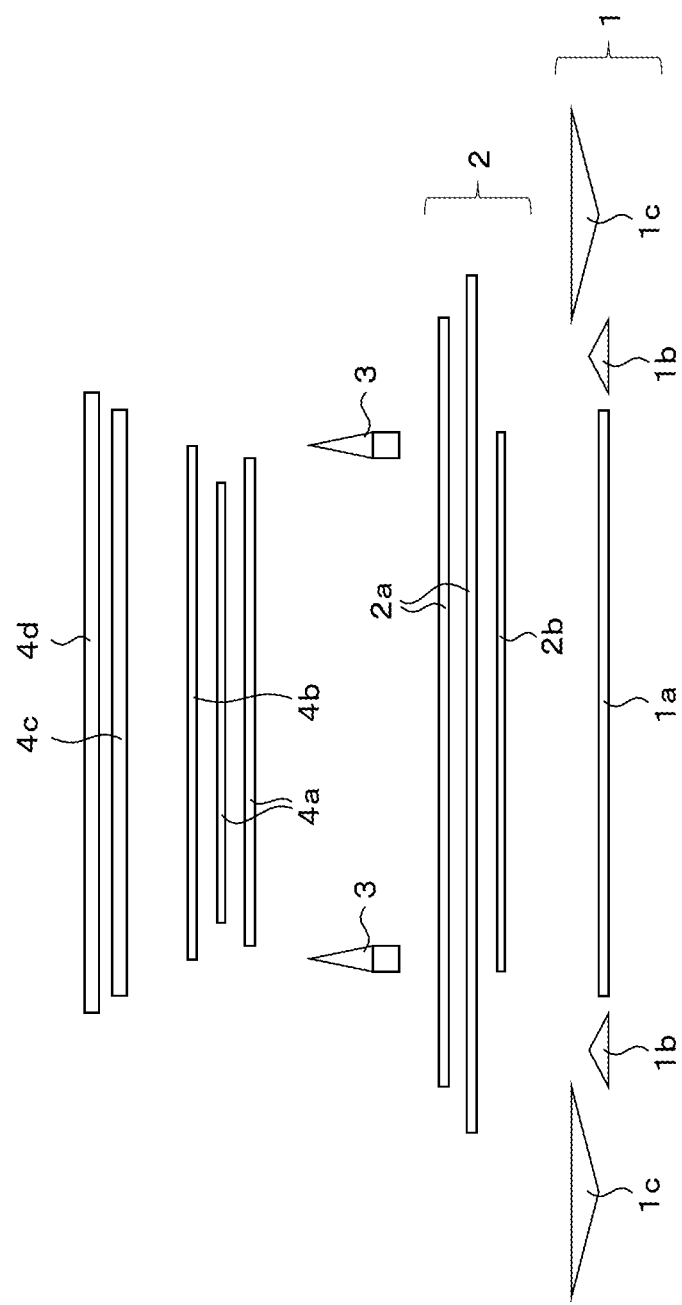
FIG. 14 is a schematic cross-sectional view showing each constituting member of a tire in an exploded manner.

FIG. 14 shows constituting members of a pneumatic tire in an exploded manner. As shown in FIG. 14, the constituting members of the pneumatic tire include an inner liner 1a, chafers 1b, and side walls 1c. Depending on the type of tire to be manufactured, a layer in which the inner liner 1a and the chafers 1b are laminated may be called an inner liner layer. However, in the present embodiment, a layer in which the inner liner 1a, the chafers 1b, and the side walls 1c are laminated is called as an inner liner layer 1, and in a tire manufacturing process, the inner liner 1a, the chafers 1b, and the side walls 1c are laminated to mold one inner liner layer 1.

In addition, the constituting members provided on an outer diameter side of the inner liner layer 1 in the tire manufacturing process include one or more (2 in a case of the figure) carcass plies 2a and a squeegee 2b. The carcass plies 2a and squeegee 2b are molded as a ply layer 2 in the tire manufacturing process. In the tire manufacturing process, the inner liner layer 1 and the ply layer 2 are combined to form a carcass band.

In addition, the constituting members provided on the outer diameter side of the carcass band in the tire manufacturing process include a pair of beads 3.

In addition, the constituting members provided on the outer diameter side of the carcass band in the tire manufacturing process include one or more belts 4a (2 in a case of the figure), a reinforcing layer 4b, a base 4c, and a cap 4d. The base 4c and the cap 4d are integrated to form a tread. In the tire manufacturing process, the belts 4a, the reinforcing layer 4b, and the tread are laminated to form a belt band.

The belt band is combined with the outer diameter side of the carcass band in which the beads 3 are set and expanded into a tire shape to form a raw tire before vulcanization molding. In addition to the constituting members shown in FIG. 14, various members are used for the pneumatic tire as needed.

Figure 1:
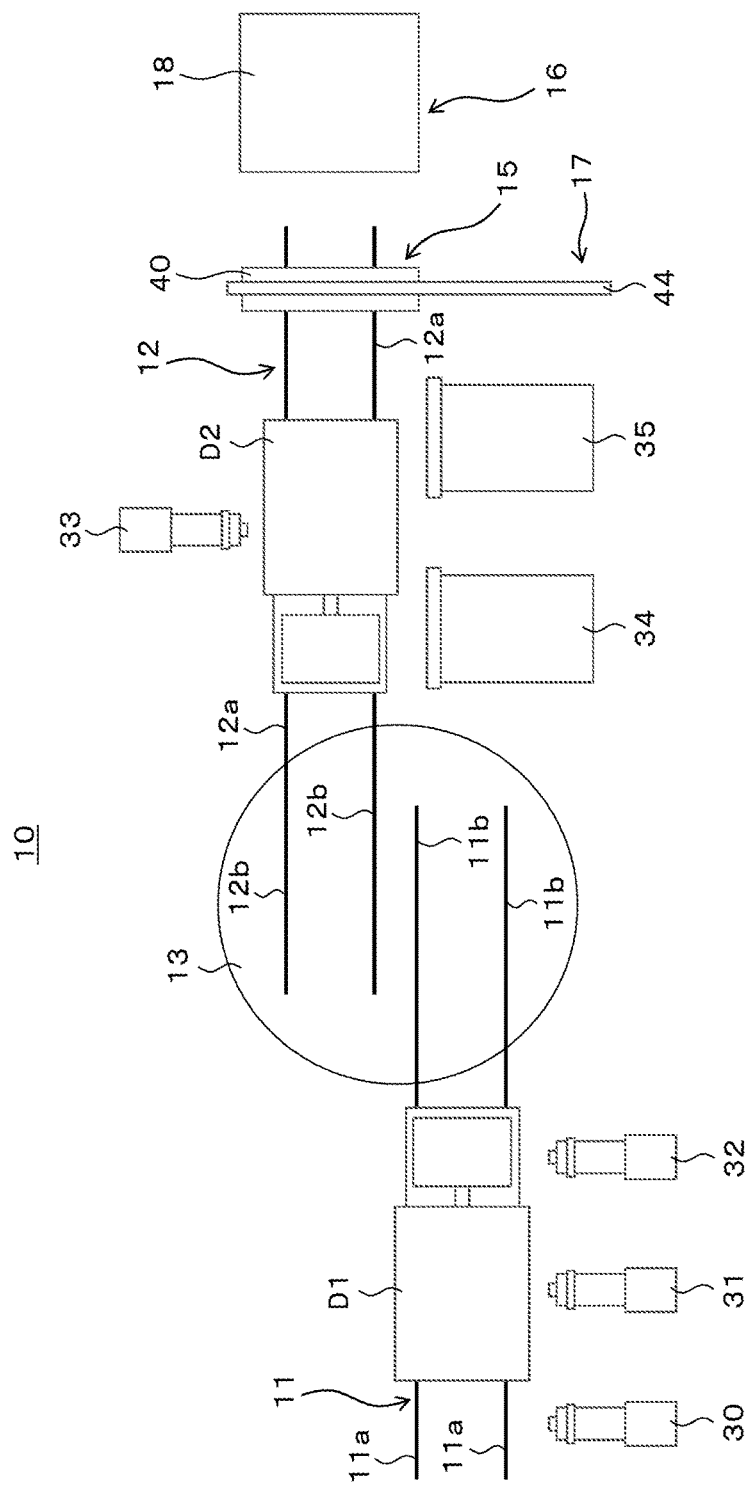
FIG. 1 is a plan view of a tire manufacturing device.

Next, a tire manufacturing device 10 of the present embodiment will be described. As shown in FIG. 1, the tire manufacturing device 10 of the present embodiment includes: a first molding drum D1; a second molding drum D2; a first moving portion 11 in which the molding drums D1 and D2 move in order to mold the inner liner layer 1; a second moving portion 12 in which the molding drums D1 and D2 move in order to mold the ply layer 2 on the inner liner layer 1; a turntable 13 that exchanges the molding drums D1 and D2 between the first moving portion 11 and the second moving portion 12; and a stitcher device 40 that presses from above the ply layer 2 laminated on the inner liner layer 1. Further, the tire manufacturing device 10 is provided with a stitcher position 15 where the stitcher device 40 performs pressing, and a transfer position 16 described later.

Then, as shown in FIG. 1, the first moving portion 11, the turntable 13, the second moving portion 12, the stitcher position 15, and the transfer position 16 are arranged in this order. However, the stitcher position 15 is located on the second moving portion 12 and near an end portion of the second moving portion 12 on the transfer position 16 side.

The molding drums D1 and D2 have a cylindrical shape, and outer diameters thereof can be expanded or contracted by a well-known structure. When the inner liner layer 1 and the ply layer 2 are molded on the molding drums D1 and D2, the outer diameters of the molding drums D1 and D2 are in an expanded state. When the inner liner layer 1 or the like is removed from the molding drums D1 and D2, the outer diameters of the molding drums D1 and D2 are contracted.

Figure 2:
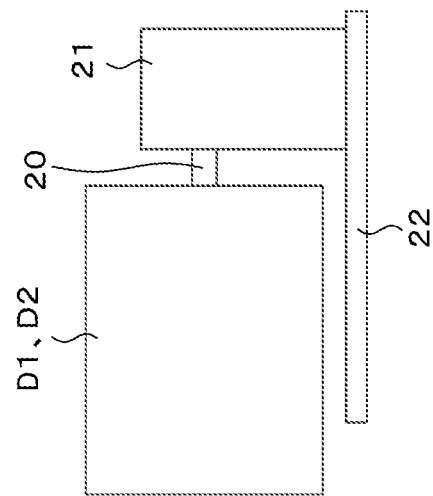
FIG. 2 is a front view of a molding drum.

As shown in FIG. 2, the molding drums D1 and D2 have a horizontal rotation shaft 20. The molding drums D1 and D2 can rotate around the rotation shaft 20. One end portion of the rotation shaft 20 is supported by a rotation device 21. The rotation device 21 is provided with a motor for rotating the molding drums D1 and D2. The rotation device 21 is mounted on a moving base 22.

As shown in FIG. 1, the first moving portion 11 and the second moving portion 12 consist of rails 11a and 12a, respectively. The moving base 22 runs on these rails 11a and 12a. Therefore, the molding drums D1 and D2 can move the first moving portion 11 and the second moving portion 12. The first moving portion 11 and the second moving portion 12 are parallel to each other. Extending directions of the first moving portion 11 and the second moving portion 12, moving directions of the molding drums D1 and D2, and an extending direction of the rotation shaft 20 of the moving molding drums D1 and D2 are the same.

A first extruding machine 30, a second extruding machine 31, and a third extruding machine 32 are arranged as a part of the tire manufacturing device 10 beside the first moving portion 11. The first extruding machine 30, the second extruding machine 31, and the third extruding machine 32 are arranged along the first moving portion 11. The first extruding machine 30, the second extruding machine 31, and the third extruding machine 32 are rubber supply devices, respectively. The first extruding machine 30, the second extruding machine 31, and the third extruding machine 32 extrude rubber strips, which are long rubber members, toward the molding drums D1 and D2 of the first moving portion 11, respectively.

The rubber strip extruded from the first extruding machine 30 is for forming the side wall 1c. Further, the rubber strip extruded from the second extruding machine 31 is for forming the chafers 1b. In addition, the rubber strip extruded from the third extruding machine 32 is for forming the inner liner 1a.

When the molding drums D1 and D2 move in front of the first extruding machine 30 and stop, the first extruding machine 30 starts extruding the rubber strip toward the molding drums D1 and D2. While the first extruding machine extrudes the rubber strip, the molding drums D1 and D2 move at a constant speed in the extending direction of the rotation shaft 20 while rotating around the rotation shaft 20. In this way, the rubber strip is helically wound around the molding drums D1 and D2, and the side walls 1c are molded. The chafers 1b and the inner liner 1a are also molded by helically winding a rubber strip in the same manner as the side walls 1c.

The molding drums D1 and D2 move on the first moving portion 11 and stop in front of the first extruding machine 30, the front of the second extruding machine 31, and the front of the third extruding machine 32, respectively. Each time the molding drums are stopped, the rubber strip is helically wound around the molding drums D1 and D2, and the tire constituting members (the side walls 1c, the chafers 1b, and the inner liner 1a) are molded. When these tire constituting members are molded, the inner liner layer 1 is completed.

A fourth extruding machine 33, a first ply supply device 34, and a second ply supply device 35 are arranged as a part of the tire manufacturing device 10 beside the second moving portion 12. The fourth extruding machine 33 and the ply supply devices 34 and 35 are arranged so as to sandwich the second moving portion 12.

The fourth extruding machine 33 is a rubber supply device. The fourth extruding machine 33 extrudes a rubber strip, which is a long rubber for forming the squeegee 2b, toward the molding drums D1 and D2 of the second moving portion 12. The squeegee 2b is molded by the fourth extruding machine 33 in the same method as a method of molding the side walls 1c by the first extruding machine 30.

In addition, when the molding drums D1 and D2 move in front of the first ply supply device 34 and stop, the first ply supply device 34 sends sheet-shaped carcass plies 2a toward the molding drums D1 and D2. The molding drums D1 and D2 are rotated to wind up the sheet-shaped carcass plies 2a. Therefore, layers of the carcass plies 2a are molded on the molding drums D1 and D2. The second ply supply device 35 also sends the sheet-shaped carcass plies 2a toward the molding drums D1 and D2 in the same manner as the first ply supply device 34. Therefore, layers of second carcass plies 2a are molded on the molding drums D1 and D2.

The molding drums D1 and D2 move on the second moving portion 12 and stop in front of the fourth extruding machine 33, in front of the first ply supply device 34, and in front of the second ply supply device 35, respectively. Each time the molding drums stop, the rubber strip or the carcass plies 2a are wound around the molding drums D1 and D2, and the tire constituting members (the squeegee 2b and the carcass plies 2a) are molded. When these tire constituting members are molded, the ply layer 2 is completed.

The stitcher device 40 is provided near an end portion of the second moving portion 12 on a side opposite to the first moving portion 11. As shown in FIG. 3, the stitcher device 40 has a main body 41 and a plurality of rollers 43. The main body 41 of the stitcher device 40 is formed with a circular hole 42 when viewed from the extending direction of the second moving portion 12. A plurality of rollers 43 are arranged along a circumferential direction of the hole 42. These rollers 43 are arranged in an annular shape. These rollers 43 are simultaneously advanced toward an inner diameter side and retracted toward an outer diameter side by a device such as a cylinder provided inside the main body 41.

When the stitcher device 40 is at the stitcher position 15, the molding drums D1 and D2 in which the inner liner layer 1 and the ply layer 2 are laminated can enter the inner diameter side of an annular ring formed by the plurality of rollers 43. When the molding drums D1 and D2 enter the inner diameter side of the annular ring formed by the plurality of rollers 43, the plurality of rollers 43 advance toward the molding drums D1 and D2 and press the ply layer 2. Further, by moving the molding drums D1 and D2 in the extending direction of the rotation shaft 20 (the extending direction of the second moving portion 12) while maintaining a pressed state, the whole of the ply layer 2 is pressed by the rollers to be brought into close contact with the inner liner layer 1, and forms the carcass band. Hereinafter, the pressing of the ply layer 2 by the rollers 43 by a method in this paragraph will be referred to as "performing a stitcher".

As shown in FIGS. 1 and 3, the stitcher device 40 is suspended from a rail 44. The rail 44 extends in a direction orthogonal to the extending direction of the second moving portion 12. The rail 44 extends horizontally from a location above the second moving portion 12 to a location away from the second moving portion 12. The stitcher device 40 can be moved along the rail 44 by a servomotor 45 provided at an upper portion thereof. That is, the stitcher device 40 can be moved in the direction orthogonal to the moving direction of the molding drums D1 and D2 (which is also the extending direction of the second moving portion 12).

In a moving range of the stitcher device 40, the location above the second moving portion 12 is the stitcher position 15. In addition, in the moving range of the stitcher device 40, the location away from the second moving portion is referred to as a standby position 17. The stitcher device 40 is advanced to the stitcher position 15 when performing the stitcher, and is retracted to the standby position 17 when the molding drums D1 and D2 move between the stitcher position 15 and the transfer position 16.

The circular turntable 13 is provided between the first moving portion 11 and the second moving portion 12. A right end portion of the first moving portion 11 is in contact with the turntable 13, and a left end portion of the second moving portion 12 is in contact with the turntable 13.

The turntable 13 is rotatable by 180° by a motor provided below the turntable 13. The turntable 13 is provided with rails 11b and 12b which are connected to the rails 11a of the first moving portion 11 and the rails 12a of the second moving portion 12, respectively. The two rails 11b and 12b on the turntable 13 are parallel.

When the turntable 13 is in a first state, the rails 11a of the first moving portion 11 and one of the rails 11b of the turntable 13 are connected to each other, and the rails 12a of the second moving portion 12 and the other of rails 12b of the turntable 13 are connected to each other. When the turntable 13 is rotated by 180° to be in a second state, the rails 11a of the first moving portion 11 and the other of the rails 12b of the turntable 13 are connected to each other, and the rails 12a of the second moving portion 12 and one of the rails 11b of the turntable 13 are connected to each other.

Since the rails are connected in this way, the molding drums D1 and D2 can move between the first moving portion 11 and the turntable 13 and can move between the second moving portion 12 and the turntable 13 in the first state and the second state. Then, the molding drums D1 and D2 can move between the first moving portion 11 and the second moving portion 12 by passing through the turntable 13.

However, a location adjacent to the end portion of the second moving portion 12 on the side opposite to the first moving portion 11 is the transfer position 16. The transfer position 16 is a location where the completed carcass band is transferred from the molding drums D1 and D2 to a transport device 18.

The transport device 18 is a device in which a large number of suction members are provided on an inner diameter side of a cylindrical tubular portion, and is generally called a transfer or the like. The molding drums D1 and D2 can enter an inner diameter side of the transport device 18 while holding the carcass band on an outer diameter surface. After the molding drums enter the inner diameter side, the suction members of the transport device 18 holds the outer diameter surface of the carcass band, and the diameters of the molding drums D1 and D2 are reduced, so that the carcass band is transferred from the molding drums D1 and D2 to the transport device 18.

Next, a tire manufacturing method using the tire manufacturing device 10 of the present embodiment will be described. The tire manufacturing method of the present embodiment is executed by controlling each portion of the tire manufacturing device 10 by a control device (not shown).

As shown in FIG. 4 (time chart), the molding of the inner liner layer 1 in the first moving portion 11 and the molding of the ply layer 2 in the second moving portion 12 are performed in parallel at the same time.

Specifically, in the first moving portion 11, the inner liner 1*a*, the chafers 1*b*, and the side walls 1*c* are molded on the first molding drum D1 in this order. Therefore, the inner liner layer 1 is completed. In addition, in the second moving portion 12, the second molding drum D2 (the second molding drum D2 in the second moving portion 12 already holds the inner liner layer 1) moves, and the squeegee 2*b* and the carcass plies 2*a* are laminated on the inner liner layer 1 in this order. Therefore, the ply layer 2 is completed on the inner liner layer 1.

Figure 5:
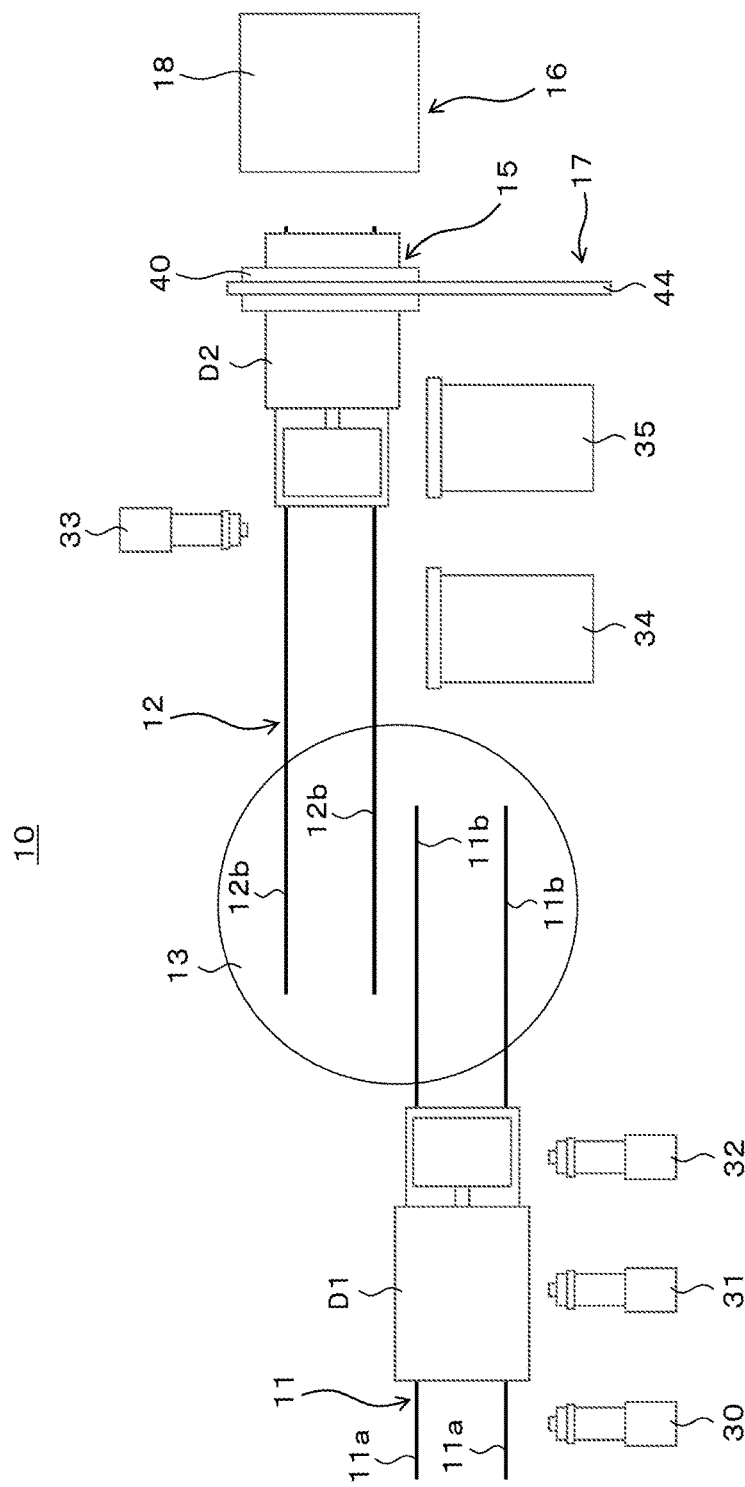
FIG. 5 is a plan view of the tire manufacturing device when a stitcher is being performed.

In the second moving portion 12, the stitcher is continuously performed after the ply layer 2 is completed. Specifically, in the second moving portion 12, the stitcher device 40 moves to the stitcher position 15 as shown in FIG. 1 at the same time as the completion of the ply layer 2 or at the timing before and after the completion of the ply layer 2. Then, after the ply layer 2 is completed, the second molding drum D2 moves to the stitcher position 15 and enters the hole 42 of the stitcher device 40 as shown in FIG. 5. When the second molding drum D2 enters the hole 42, the rollers 43 of the stitcher device 40 advances toward the second molding drum D2 and presses the ply layer 2 on the second molding drum D2. While the pressed state by the rollers 43 is maintained, the second molding drum D2 reciprocates a plurality of times in the extending direction of the rotation shaft 20, so that the ply layer 2 comes into close contact with the inner liner layer 1 and forms a carcass band.

Figure 6:
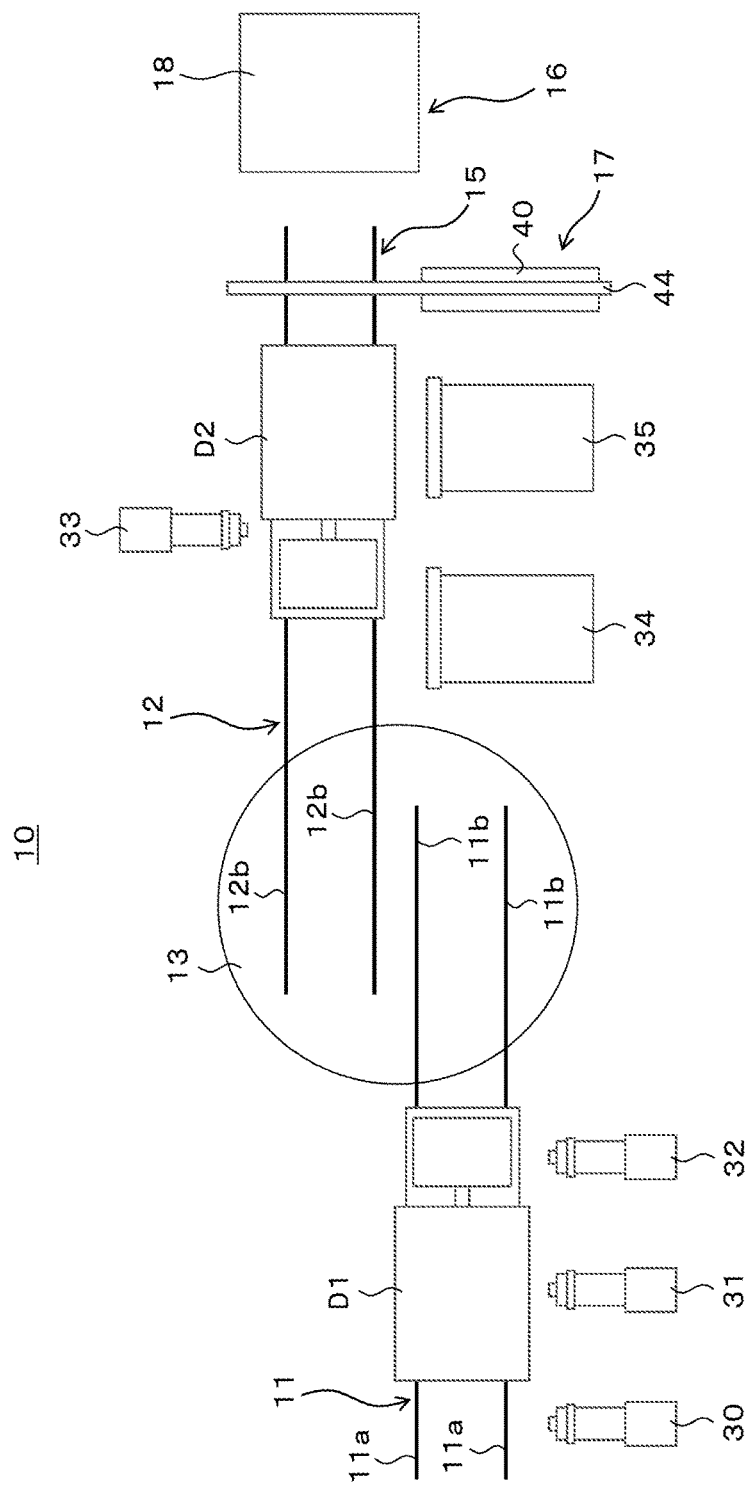
FIG. 6 is a plan view of the tire manufacturing device when the stitcher device is retracted to a standby position.
Figure 7:
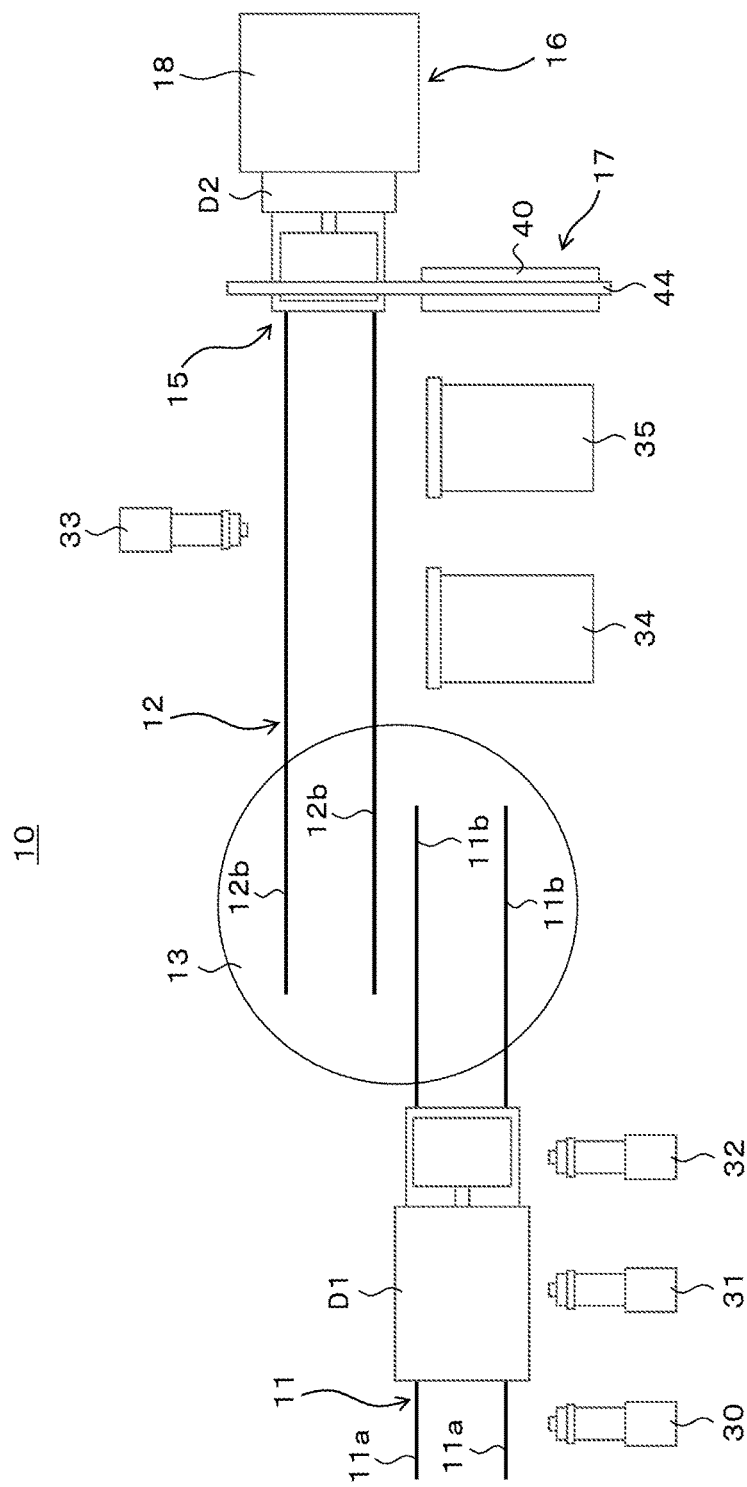
FIG. 7 is a plan view of the tire manufacturing device when the molding drum is in a transfer position.

Further, on the second moving portion 12 side, when the stitcher is finished, the second molding drum D2 is temporarily retracted from the stitcher position 15 to a location on the turntable 13 side. While the second molding drum D2 is retracted to the location on the turntable 13 side, the stitcher device 40 retracts to the standby position 17 as shown in FIG. 6. After the stitcher device 40 is retracted, the second molding drum D2 moves to the transfer position 16 as shown in FIG. 7. The transport device 18 is on standby at the transfer position 16, and the carcass band is transferred from the second molding drum D2 to the transport device 18.

When the inner liner layer 1 is completed in the first moving portion 11, the first molding drum D1 moves to the turntable 13 while holding the inner liner layer 1. In addition, after the carcass band is transferred to the transport device 18, the second molding drum D2 moves to the turntable 13 without holding anything.

Figure 8:
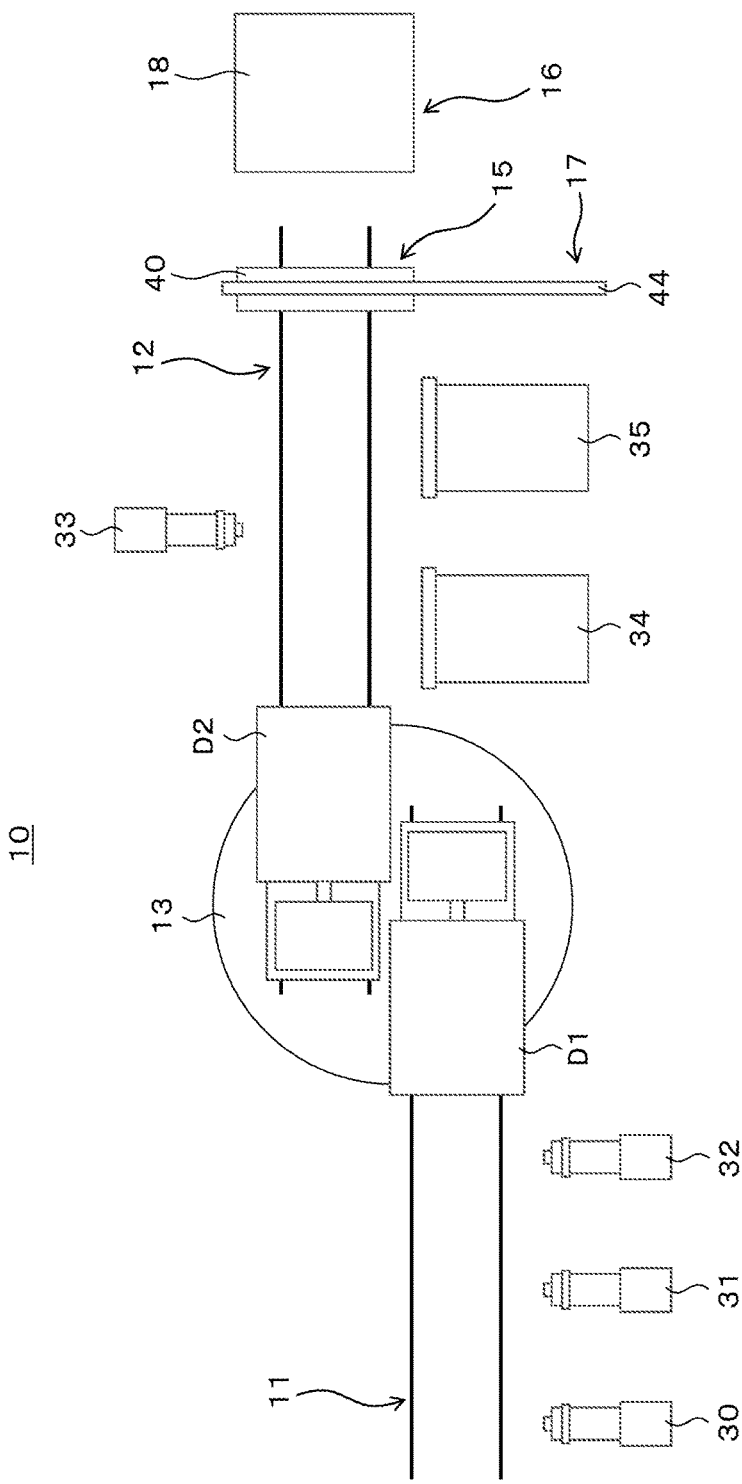
FIG. 8 is a plan view of the tire manufacturing device when two molding drums are placed on a turntable.

As shown in FIG. 8, when the first molding drum D1 and the second molding drum D2 are placed on the turntable 13, the turntable 13 rotates 180°. As a result, the first molding drum D1 moves to the second moving portion 12 side, and the second molding drum D2 moves to the first moving portion 11 side.

After the molding drums D1 and D2 move via the turntable 13, the molding of the inner liner layer 1 in the first moving portion 11 and the molding of the ply layer 2 in the second moving portion 12 are performed again in parallel at the same time.

Specifically, the ply layer 2 is laminated on the first molding drum D1 that moves to the second moving portion 12, and the ply layer 2 is stitched. The carcass band completed by the stitcher is transferred to the transport device 18 at the transfer position 16. Further, the inner liner layer 1 is molded in the second molding drum D2 that moves to the first moving portion 11.

The molding of the inner liner layer 1 in the first moving portion 11 and the molding of the ply layer 2 in the second moving portion 12 as described above are repeated.

The carcass band transferred to the transport device 18 is transported to the subsequent process. In the subsequent process, well-known processes such as a process in which the bead 3 is set in the carcass band, a process in which the carcass band is expanded into the tire shape, a process in which the belt band (a cylindrical member including the belt 4*a* and the tread) is combined with the expanded carcass band, and the like are performed, and a raw tire is completed. When the raw tire is placed in a mold and vulcanized, a pneumatic tire is completed.

Next, an effect of the present embodiment will be described. As described above, in the tire manufacturing device 10 of the present embodiment, the stitcher position 15 and the transfer position 16 are adjacent to each other. Therefore, the completed carcass band after the stitcher is finished can be immediately sent to the transfer position 16. Therefore, a manufacturing efficiency of the tire is good.

In addition, when the completed carcass band after the stitcher is finished is sent to the transfer position 16, it is not necessary to pass through the first moving portion 11 or the like, and therefore, there is no problem that the carcass band is not sent to the transfer position 16 until the molding of the inner liner layer 1 in the first moving portion 11 is completed.

In addition, in the tire manufacturing device 10 of the present embodiment, the first moving portion 11, the second moving portion 12, the stitcher position 15, and the transfer position 16 are arranged in this order. Therefore, a member is transported in one direction from the first moving portion 11 in which the inner liner layer 1 is molded to the transfer position 16 to which the carcass band is transported. Therefore, a manufacturing efficiency of the carcass band is good.

In addition, in the tire manufacturing device 10 of the present embodiment, the stitcher device 40 for performing the stitcher at the stitcher position 15 can advance and retreat with respect to the stitcher position 15. Therefore, when the molding drums D1 and D2 move from the stitcher position to the transfer position 16 in order to transfer the carcass band, the stitcher device 40 can be separated from the stitcher position 15 and does not interfere with the movement of the molding drums D1 and D2.

In addition, in the tire manufacturing device 10 of the present embodiment, in the first moving portion 11, the rubber strips extruded from the first extruding machine 30, the second extruding machine 31, and the third extruding machine 32 are helically wound around the molding drums D1 and D2 to mold the inner liner layer 1. It takes time to mold the inner liner layer 1 by helically winding such rubber strips.

However, in the tire manufacturing device 10 of the present embodiment, an assembled body of the inner liner layer 1 and the ply layer 2 in front of the stitcher can be sent to the stitcher position 15 without passing through the first moving portion 11. In addition, the carcass band after the stitcher can be sent to the transfer position 16 without passing through the first moving portion 11. Therefore, even if it takes time to mold the inner liner layer 1 in the first moving portion 11, the assembled body of the inner liner layer 1 and the ply layer 2 can be sent to the stitcher position 15 without waiting for the completion of the molding, and the carcass band can be sent to the transfer position 16. Therefore, the manufacturing efficiency of the carcass band is good.

In addition, in the tire manufacturing method of the present embodiment, since the carcass band is sent from the stitcher position 15 to the adjacent transfer position 16, the manufacturing efficiency of the carcass band is good.

Various modifications can be made to the above embodiment. Hereinafter, modifications of the embodiment will be described.

Modification 1

Figure 9:
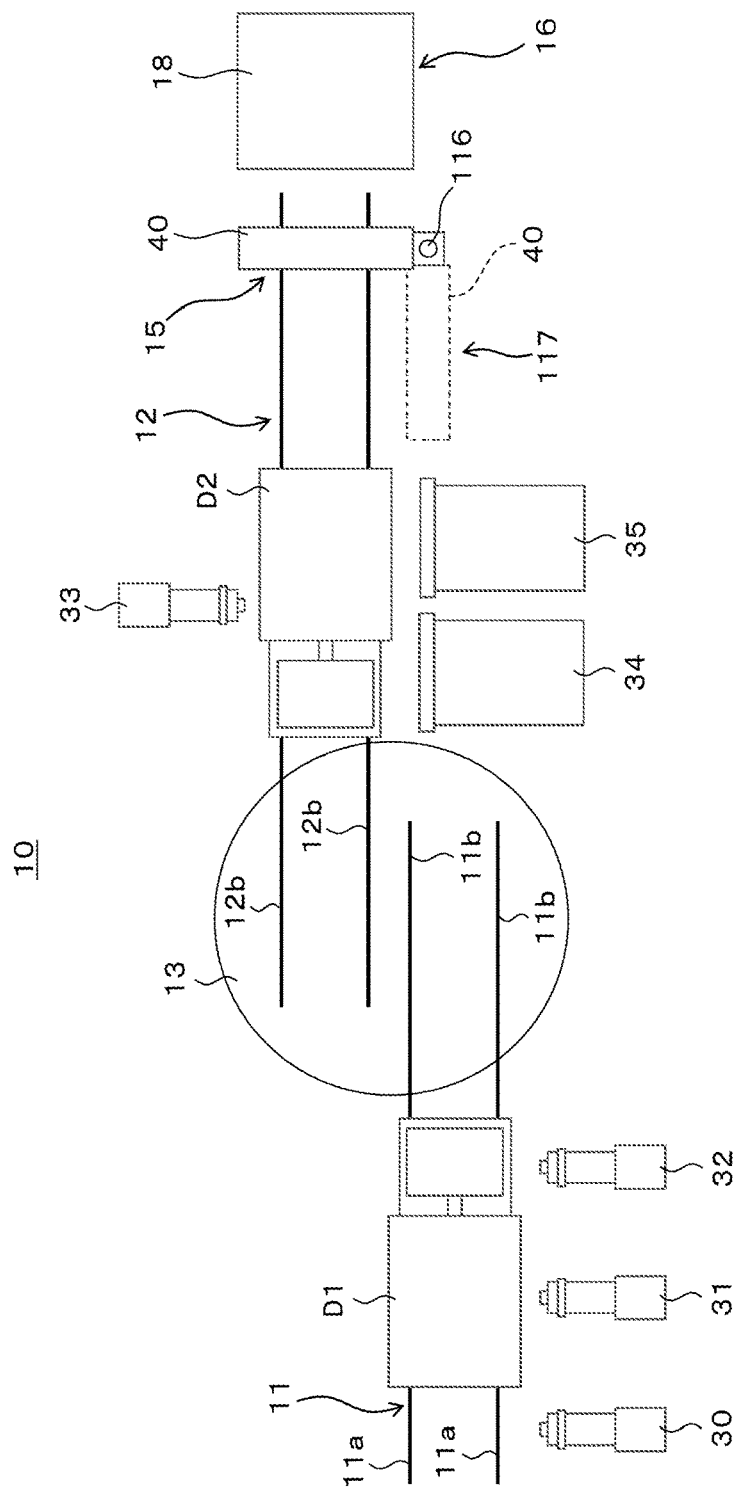
FIG. 9 is a plan view of a tire manufacturing device of Modification 1.

In a modification shown in FIG. 9, a shaft 116 extending in a vertical direction is provided on one of left and right sides of the stitcher device 40. The stitcher device 40 can rotate 90° around the shaft 116 when viewed from above.

When the molding drums D1 and D2 move between the stitcher position 15 and the transfer position 16, or the like, the stitcher device 40 stands by in parallel with the second moving portion 12 at one of left and right standby positions 117 of the second moving portion 12. The stitcher device 40 when at the standby position 117 is shown by a broken line in FIG. 9.

On the other hand, when the stitcher device 40 performs the stitcher, the stitcher device 40 rotates 90° around the shaft 116 and advances to the stitcher position 15. The stitcher device 40 when at the stitcher position 15 is shown by a solid line in FIG. 9.

Modification 2

Figure 10:
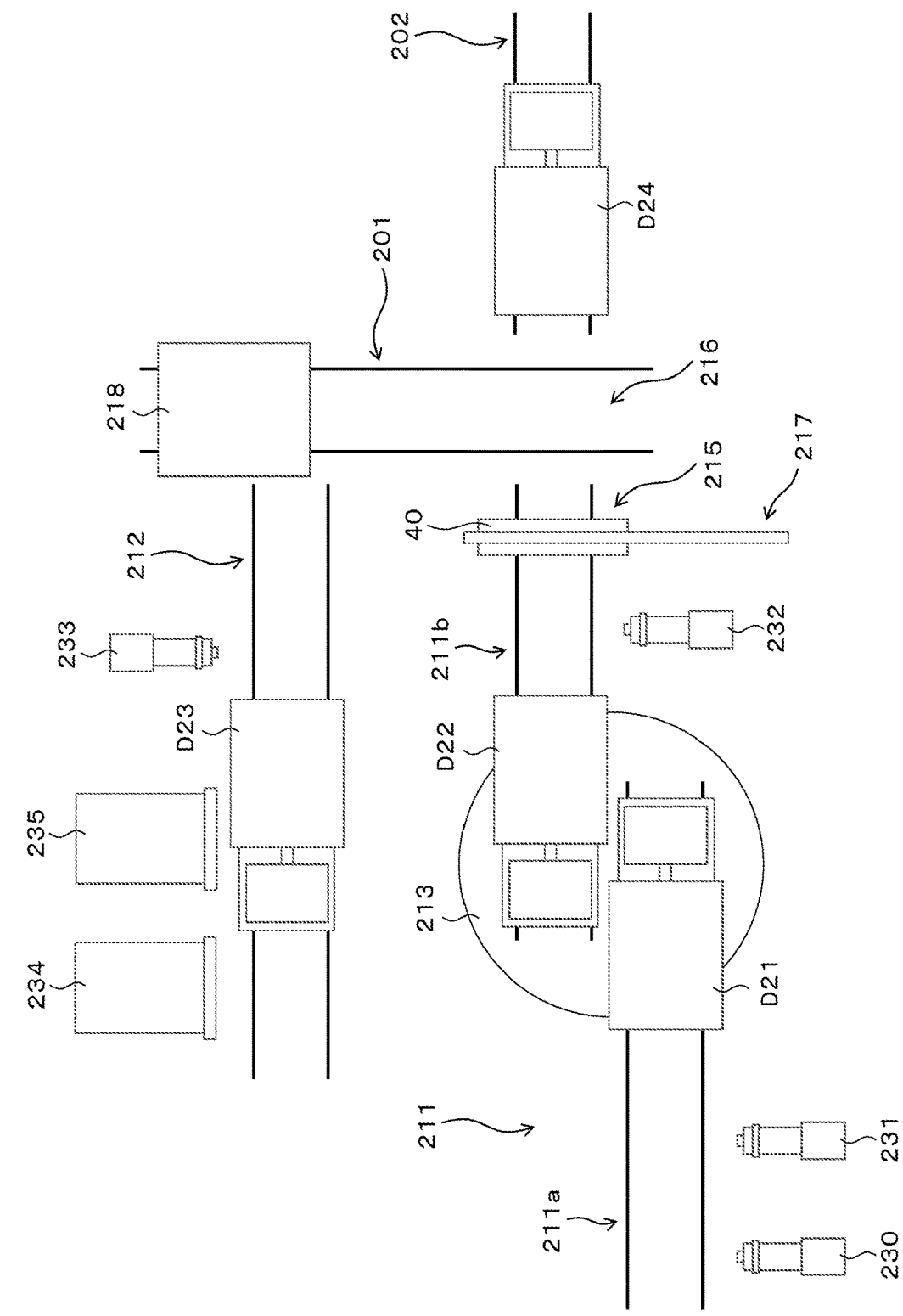
FIG. 10 is a plan view of a tire manufacturing device of Modification 2.

In a modification shown in FIG. 10, a first moving portion 211 and a second moving portion 212 are provided in parallel. The first moving portion 211 is a location where inner liner layer molding drums D21 and D22 for molding the inner liner layer 1 move. In addition, the second moving portion 212 is a location where a ply layer molding drum D23 for molding the ply layer 2 moves.

The first moving portion 211 is further separated into a first-first moving portion 211a and a first-second moving portion 211b. In addition, a turntable 213 is arranged between the first-first moving portion 211a and the first-second moving portion 211b. The turntable 213 of the present modification is the same as the turntable 13 of the embodiment.

Two extruding machines 230 and 231 are arranged beside the first-first moving portion 211a, and one extruding machine 232 is arranged beside the first-second moving portion 211b. The inner liner layer 1 is molded by winding rubber strips from the extruding machines 230, 231, and 232 while the inner liner layer molding drums D21 and D22 move back and forth between the first-first moving portion 211a and the first-second moving portion 211b via the turntable 213.

In addition, ply supply devices 234 and 235 and an extruding machine 233 are arranged beside the second moving portion 212. While the ply layer molding drum D23 moves in the second moving portion 212, the ply layer 2 is molded by winding the carcass plies 2a from the ply supply devices 234 and 235 and winding the rubber strip from the extruding machine 233.

In the vicinity of an end portion of the first-second moving portion 211b, a stitcher position 215 is set on a rail of the first-second moving portion 211b. At the stitcher position 215, the same stitcher device 40 as that of the above embodiment can advance and retreat.

A transfer position 216 is provided adjacent to the stitcher position 215. The transfer position 216 is a location where the carcass band completed at the stitcher position 215 is transferred to a transport device 218. The transport device 218 has a cylindrical shape and can hold the ply layer 2 and the carcass band on an inner diameter side thereof.

From a location adjacent to an end portion of the second moving portion 212 to the transfer position 216, a third moving portion 201 extending in a direction perpendicular to the first moving portion 211 and the second moving portion 212 is provided. The transport device 218 is movable in the third moving portion 201.

A fourth moving portion 202 is provided at a location on a side opposite to the stitcher position 215 with the transfer position 216 interposed therebetween. A bead set drum D24 for setting the bead 3 on an outer diameter side of the carcass band can move in the fourth moving portion 202.

In a carcass band manufacturing method in this modification, first, the molding of the inner liner layer 1 in the first moving portion 211 and the molding of the ply layer 2 in the second moving portion 212 are performed in parallel.

Figure 11:
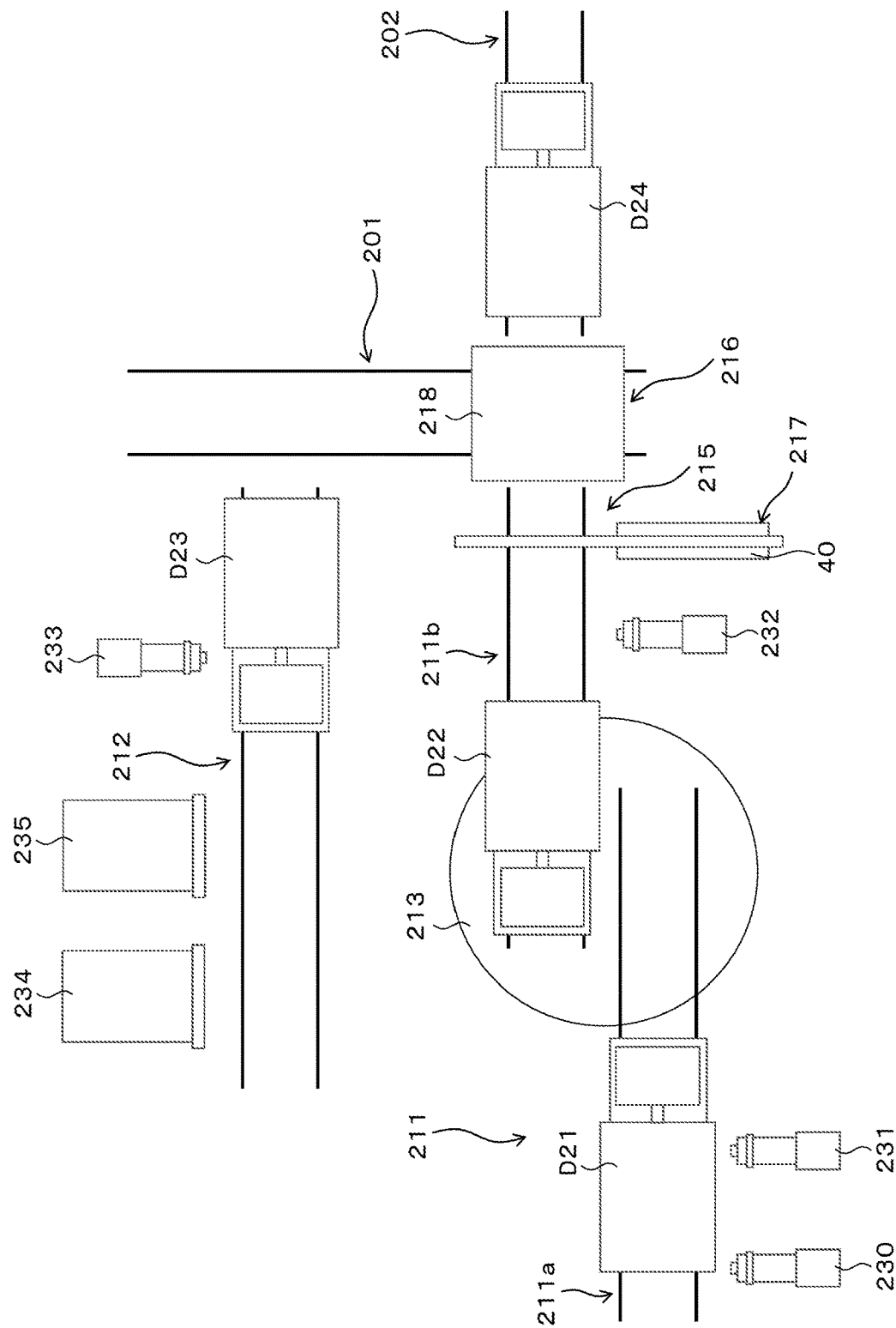
FIG. 11 is a plan view of the tire manufacturing device of Modification 2 when a transport device is moved to a transfer position.

Next, as shown in FIG. 11, the transport device 218 receives the ply layer 2 from the ply layer molding drum D23 and moves to the transfer position 216. Further, the stitcher device 40 retreats from the stitcher position 215 to a standby position 217.

Figure 12:
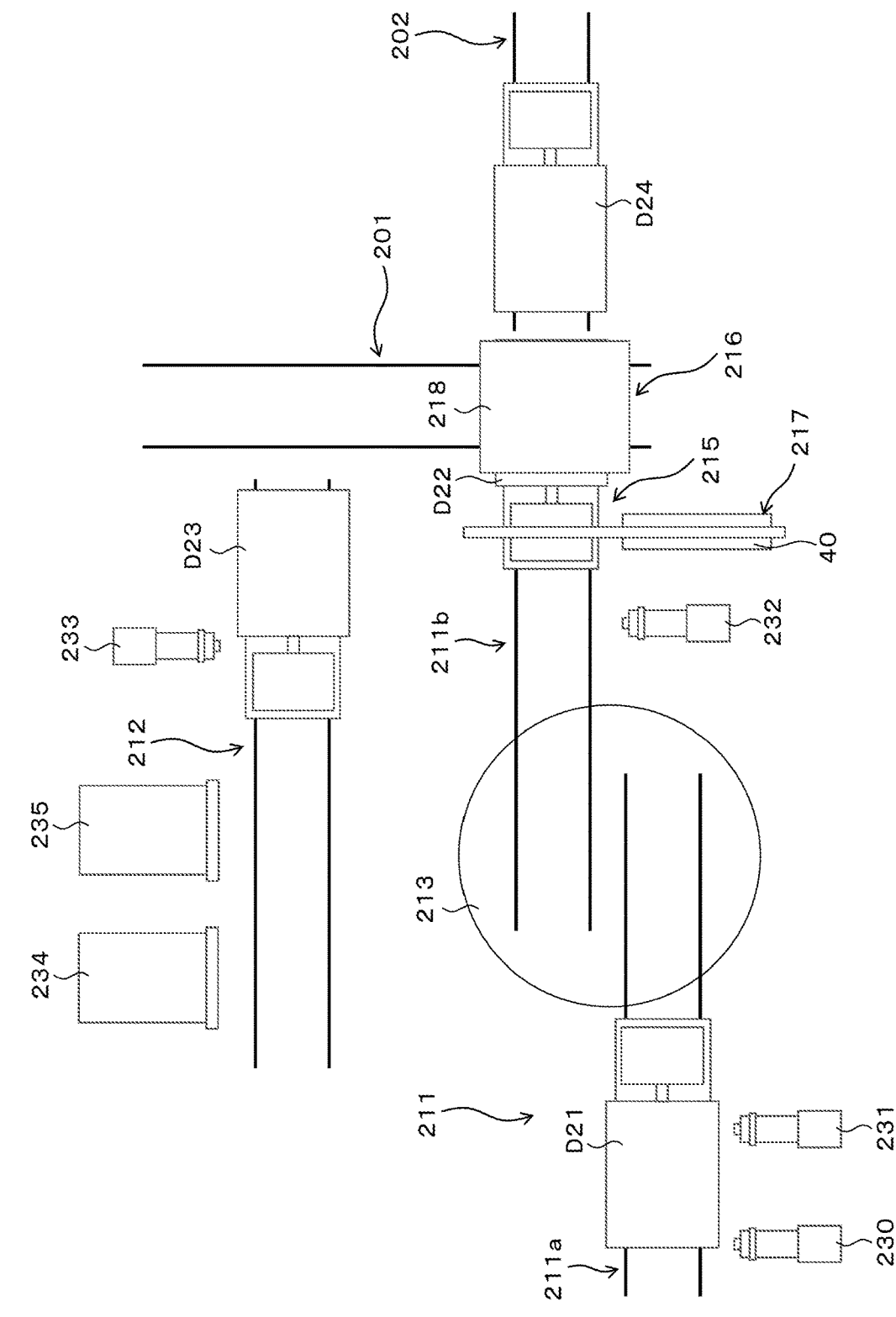
FIG. 12 is a plan view of the tire manufacturing device of Modification 2 when a molding drum of an inner liner layer enters a transport device.

When the transport device 218 reaches the transfer position 216, as shown in FIG. 12, the inner liner layer molding drum D22 (or D21) enters the inner diameter side of the transport device 218 while holding the inner liner layer 1. Then, the ply layer 2 is transferred from the transport device 218 to the outer diameter side of the inner liner layer 1 held by the inner liner layer molding drum D22 (or D21). Therefore, an assembled body of the inner liner layer 1 and the ply layer 2 is completed on the inner liner layer molding drum D22 (or D21).

Next, the inner liner layer molding drum D22 (or D21) holding the assembled body of the inner liner layer 1 and the ply layer 2 retracts from the transfer position 216 (that is, moves toward the turntable 213 side), and retreats from the stitcher position 215.

Figure 13:
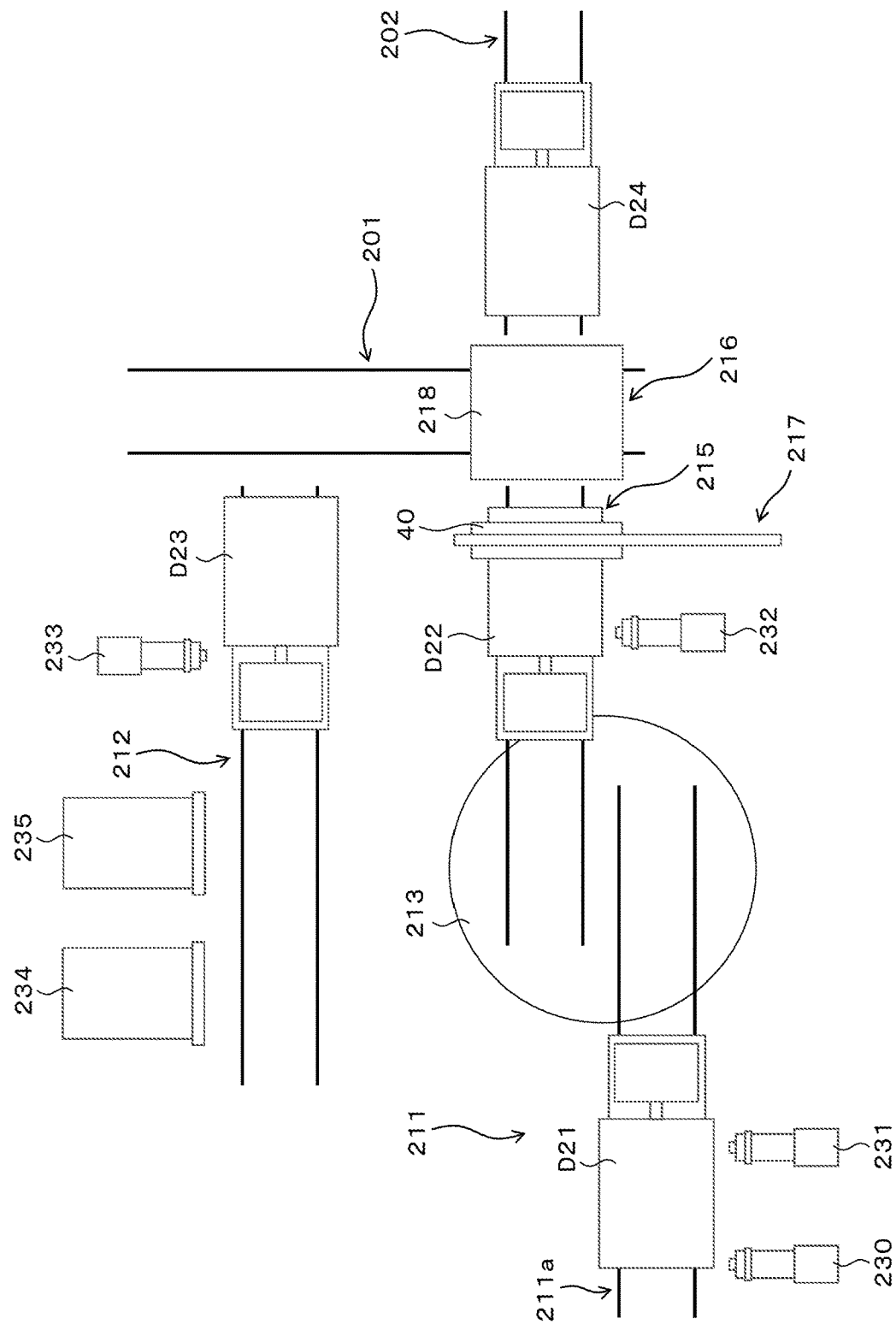
FIG. 13 is a plan view of the tire manufacturing device of Modification 2 when the molding drum of the inner liner layer enters a stitcher device.

Next, the stitcher device 40 advances to the stitcher position 215. Next, as shown in FIG. 13, the inner liner layer molding drum D22 (or D21) holding the assembled body of the inner liner layer 1 and the ply layer 2 enters the hole 42 of the stitcher device 40 at the stitcher position 215. Then, the stitcher is performed by the stitcher device 40, and the carcass band is completed on the inner liner layer molding drum D22 (or D21).

Next, the inner liner layer molding drum D22 (or D21) retracts from the stitcher position 215 (that is, moves to the turntable 213 side) while holding the carcass band. Next, the stitcher device 40 also retreats from the stitcher position 215 to the standby position 217.

Next, while the inner liner layer molding drum D22 (or D21) holds the carcass band, the inner liner layer molding drum D22 (or D21) enters the inner diameter side of the transport device 218 at the transfer position 216 in the same manner as in FIG. 12, and transfers the carcass band to the transport device 218. After that, the transport device 218 transfers the carcass band to the bead set drum D24. The bead set drum D24 moves in the fourth moving portion 202 to transport the carcass band to the next process.

Even in the device and method of this modification, since the stitcher position 215 and the transfer position 216 are adjacent to each other, the carcass band can be efficiently molded.

What is claimed is:

1. A tire manufacturing device, comprising:
   a molding drum;
   a first moving portion in which the molding drum moves in order to mold an inner liner layer on the molding drum;
   a second moving portion in which the molding drum moves in order to mold a ply layer on the inner liner layer;
   a stitcher device having a main body with a circular hole and a plurality of rollers for pressing the ply layer, the plurality of rollers forming an annular ring along a circumferential direction of the circular hole;
   a stitcher position where the molding drum is positioned in an inner diameter of the annular ring formed by the plurality of rollers and a carcass band is formed by the stitcher device performing pressing from above the ply layer laminated on the inner liner layer; and
   a transfer position where the carcass band is transferred from the molding drum to a transport device that transports the carcass band to a subsequent process, wherein
   the stitcher position and the transfer position are adjacent to each other,
   the molding drum is movable from the stitcher position to the transfer position, and
   the stitcher device hangs from a rail and is movable between the stitcher position and a standby position along the rail, the standby position being different from the stitcher position and disconnected from a path of movement of the molding drum from the stitcher position to the transfer position.

2. The tire manufacturing device according to claim 1, wherein
   the first moving portion, the second moving portion, the stitcher position, and the transfer position are arranged in this order.

3. The tire manufacturing device according to claim 1, wherein the stitcher device is movable forward and backward with respect to the stitcher position.

4. The tire manufacturing device according to claim 1, wherein
   the first moving portion is provided with a supply device of a rubber which is a material of a tire constituting member included in the inner liner layer, and
   the supply device molds the tire constituting member by helically winding a long rubber member around the molding drum.

* * * * *